UNITED STATES PATENT OFFICE.

SIGMOND SAXE, OF NEW YORK, N. Y.

MANUFACTURE OF LACTIC ACID.

1,249,511.                Specification of Letters Patent.      Patented Dec. 11, 1917.

No Drawing.        Application filed April 20, 1917.   Serial No. 163,424.

*To all whom it may concern:*

Be it known that I, SIGMOND SAXE, a citizen of the United States, residing at New York, in the county of New York and State of New York, have invented certain new and useful Improvements in the Manufacture of Lactic Acid, of which the following is a specification.

This invention relates to the manufacture of lactic acid; and it comprises a method wherein vegetable ivory, or material of like composition, is hydrolyzed and fermented with a lactic ferment, such fermentation being with or without the presence of a base to neutralize the lactic acid as it forms; all as more fully hereinafter set forth and as claimed.

Lactic acid is a material of great utility in many arts. Because of its pleasant sour flavor it is used in beverages and foods; and as a vegetable acid of no great strength and free from corrosive action, it is largely used in dyeing, tanning, etc. It may be formed by fermentation of carbohydrates and carbohydrate material by the action of very many kinds of bacteria and microörganisms; there being indeed a group classification of these organisms according to their power or lack of power of forming lactic acid. Not all these organisms however form lactic acid with the same yield or the same degree of purity; there being wide differences in both respects. All lactic fermentations are accompanied by the production of by-products; the amount and character of these by-products depending in part on the material fermented and in part on the ferment. Lactic acid is often a main product, but it is never the only product, even where a pure lactic ferment is used. Where the ferment is not pure, that is when other organisms are present, the product may be much contaminated. And in practice it is often difficult to insure that the fermentation shall be a "pure culture" containing but a single organism, the lactic bacterium desired. The character and amount of the accessory substances formed materially influence the commercial value of the product of any lactic fermentation; not only for food purposes, where flavor is an important consideration, but for other purposes as well. As stated, these by-products depend not only upon the organism used, but also upon the nature of the material fermented. The amount and character of proteids or nitrogenous bodies and mineral matters much influence their amount and character.

Lactic acid fermentation may produce free lactic acid, but in this event it does not usually go very far, the accumulating acid retarding and finally interrupting fermentation, even by the lactic bacteria themselves. The degree of acidity where the action pauses differs somewhat with the different bacteria, but ordinarily does not much exceed 0.75 per cent. lactic acid. If basic materials, such as calcium carbonate (whiting) zinc oxid, etc., be present to neutralize the free acid the action goes much further; even to the point where most of the nutritive material is consumed. In this event, the product is of course a lactate and not lactic acid as such. But lactic acid may be readily recovered from the lactates by stronger aids, such as sulfuric acid.

Lactic acid is ordinarily made by the fermentation of starch or its hydrolytic products, maltose and dextrose (glucose). Sometimes a cane sugar solution or molasses is used. For food articles, milk sugar and skim milk are often used; as in fermenting milk with *B. bulgaricus.*

I have found that if I use what is known in commerce as "vegetable ivory" I can obtain a particularly advantageous type of lactic fermentation with the production of high yields of clean and pure material. "Vegetable ivory" is a very hard, ivory-like material used for making buttons and like purposes. Most of it is the product of certain tropical American palms (*Phytelephas, sp.*) though similar materials of other origin are known as Tahiti nuts, Fiji nuts, ivory nuts, etc. Waste material from button-making and other manufacture can be easily and cheaply secured and used for the present purposes.

In spite of the mechanically hard and resistant nature to which vegetable ivory owes its employment in the arts the material is easily and readily broken down or hydrolyzed by chemical agencies, such as dilute acids. When so hydrolyzed it does not yield the same products as most other vegetable materials but gives the peculiar sugar known as mannose. Probably the advantageous results of the present process are due to this fact.

In a practical embodiment of this invention, I take button-makers' waste and fine grind it; say to 20 or 30 mesh. It may be even finer. The material is next hydrolyzed to produce a solution containing mannose. For this purpose I may boil one part of sifted material with, say, 2 parts of 3 per cent. sulfuric acid for six hours, and cool. The mixture, with or without a preliminary treatment in a filter press, is next treated with calcium carbonate (whiting) to convert the sulfuric acid into insoluble sulfate of calcium. The liquid is separated from the precipitate and accompanying insoluble matters by settling or filter pressing. The liquid thus obtained is ready for fermentation.

Fermentation may be in either of two ways. Where it is desirable to make free lactic acid, the liquid made as above described which has about 15 to 30 per cent. of mannose content may be diluted to 10 to 15 per cent. of mannose content and inoculated with any suitable lactic ferment under the ordinary bacteriological precautions. In making an acid liquid for food purposes, the inoculating organism is advantageously *B. bulgaricus* because of the particularly pleasant flavor given by this organism. For other purposes the liquor made as above described may be mixed with more or less whiting or zinc oxid and inoculated with a lactic bacterium. This addition of base serves to neutralize the acid as fast as it is formed and allows the bacillus to give a complete conversion even in tolerably concentrated liquids. The fermentation goes on regularly with formation of calcium lactate or zinc lactate, as the case may be. The absence of foreign bacteria is desirable in this process, since some of them have the tendency to ferment the lactate further with production of butyrate.

After the fermentation has gone forward to the substantial conversion of mannose and the base present into lactate, the process of fermentation is interrupted. The further steps depend upon the particular material desired. The lactate may be purified by re-crystallization and the re-crystallized lactate then decomposed with sulfuric acid in the case of calcium lactate or with sulfureted hydrogen in the case of zinc lactate. Ordinarily, however, I do not re-crystallize but simply decompose the fermented mass as it is. For this purpose it is better to ferment to calcium lactate insted of zinc lactate. The magma containing calcium lactate is simply treated with an amount of sulfuric acid equivalent to the calcium present, forming insoluble sulfate of lime which deposits. The solution of lactic acid may be further concentrated in any of the known ways to produce a commercial lactic acid for tanning, dietetic purposes, etc.

The fermentation may be conducted at any temperature desired. A temperature of about 40° C. is convenient. Where the vegetable ivory is hydrolyzed with sulfuric acid and this sulfuric acid neutralized with whiting, enough of the whiting may be added at the same time to serve in the subsequent fermentation, the calcium sulfate formed in the first fermentation not being removed but allowed to remain with the mixture. The whiting used for neutralization in the fermentation should be baked at a low temperature to sterilize it. It is best to sterilize everything to prevent access of undesirable foreign ferments and particularly the butyric organisms. It is better to work with a pure culture of lactic organisms under aseptic conditions.

A certain amount of other carbohydrates, such as cane sugar, may be added to the fermenting mixture, and frequently with some advantage. Various nutritive salts and substances, such as ammonium salts, may be added to promote growth of the ferment organisms.

What I claim is:

1. The process of making lactic acid which comprises fermenting an extract of vegetable ivory with an organism capable of producing lactic acid.

2. The process of making lactic acid which comprises hydrolyzing vegetable ivory with an acid, neutralizing the extract and fermenting with a lactic organism.

3. The process of making lactic acid which comprises hydrolyzing vegetable ivory with an acid, neutralizing the extract and fermenting with a lactic organism, the fermentation being conducted in the presence of a base adapted to form lactates.

4. The process of making lactic acid which comprises hydrolyzing vegetable ivory with sulfuric acid, neutralizing the sulfuric acid to form calcium sulfate, adding calcium carbonate in quantity sufficient to form a neutral lactate after fermentation, inoculating with a lactic ferment, fermenting and breaking up the fermented mixture with an amount of sulfuric acid equivalent to the calcium present.

In testimony whereof, I affix my signature.

SIGMOND SAXE.